(12) United States Patent
Kim

(10) Patent No.: US 6,230,626 B1
(45) Date of Patent: May 15, 2001

(54) FLASHLESS MK 66 ROCKET MOTOR

(75) Inventor: Steven S. Kim, Crofton, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/511,376

(22) Filed: Feb. 23, 2000

(51) Int. Cl.[7] .............................. C06B 45/00; C06D 5/00; C06D 5/06
(52) U.S. Cl. ........................ 102/289; 102/291; 102/287; 102/290; 60/253; 60/254; 60/255; 60/256
(58) Field of Search .................... 102/289, 295, 102/287, 290; 60/253–256

(56) References Cited

U.S. PATENT DOCUMENTS

| | | |
|---|---|---|
| 3,107,620 * | 10/1963 | O'Donnell ........................ 102/291 |
| 3,166,896 | 1/1965 | Breitengross, Jr. et al. ......... 60/35.6 |
| 3,508,494 * | 4/1970 | Caveny ................................ 102/291 |
| 3,951,706 | 4/1976 | Eldridge .............................. 149/19.8 |
| 3,960,621 | 6/1976 | Whitworth et al. .................... 149/65 |
| 3,985,594 | 10/1976 | Bjorn ................................ 149/108.4 |
| 4,381,270 | 4/1983 | Bjorn et al. ......................... 264/3 B |
| 4,642,983 | 2/1987 | Melvin et al. ......................... 60/219 |
| 4,701,228 | 10/1987 | Lagreze et al. ................... 149/109.6 |
| 5,565,643 | 10/1996 | Raines et al. ........................ 102/289 |

* cited by examiner

Primary Examiner—Michael J. Carone
Assistant Examiner—Glenda L. Sánchez
(74) Attorney, Agent, or Firm—Mark Homer

(57) ABSTRACT

A flashless rocket propellent has a continuous potassium sulfate rod extending though the length of the propellent component. The flashless rocket propellent is particularly useful in the MK 66 Rocket Motor.

19 Claims, 2 Drawing Sheets

FLASHLESS MK 66 ROCKET MOTOR

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention relates to a flashless rocket propellant. More particularly, the flashless rocket propellant of the present invention contains a continuous potassium sulfate rod that effectively removes the flash signature of the rocket. The flashless rocket propellant is useful in such rocket motors as the MK 66 Rocket Motor.

2. Brief Description of the Related Art

The United States Navy uses the MK 66 Rocket Motor which contains a small potassium sulfate (spelled also as potassium sulphate) rod to partially suppress motor plume flash. Generally, MK 66 Rocket Motors contain a small potassium sulfate ($K_2SO_4$) salt rod bonded to a stabilizing rod to suppress the motor plume flash and help control combustion instability. The potassium sulfate rod has a constant diameter with a 0.33 inch diameter. The $K_2SO_4$ suppresses the plume flash by preventing the fuel rich exhaust products, primarily CO and $H_2$, from reacting with atmospheric oxygen.

The MK 66 Rocket Motor is a 2.75 inch rocket system designed to be operated from rotary and fixed wing aircraft. The rocket motor delivers a variety of warheads which include high explosive and submunition warheads. The 2.75 inch MK 66 Rocket Motor produces a bright exhaust flash which is visible to approximately 800 feet.

The addition of significant amounts of $K_2SO_4$ to the double-base propellant mix, for rocket motor plume flash suppression, has been found to adversely affect the ballistic performance of the rocket motor. Increased amounts of potassium sulfate within the rocket motor create overpressurization within motor tube, causing failure. Accordingly, the volume of $K_2SO_4$ in the MK 66 has been limited for performance criteria. This limited amount of potassium sulfate for release into the exhaust stream is generally insufficient for rendering the complete burning time of the rocket motor flashless.

Several patents disclose the use of potassium sulfate compositions: U.S. Pat. No. 3,166,896 to Breitengross, Jr. et al.; U.S. Pat. No. 3,951,706 to Eldridge; U.S. Pat. No. 3,960,621 to Whitworth, et al.; U.S. Pat. No. 3,985,594 to Bjorn; U.S. Pat. No. 4,381,270 to Bjorn, et al.; U.S. Pat. No. 4,642,983 to Melvin et al.; U.S. Pat. No. 4,701,228 to Lagreze; and U.S. Pat. No. 5,565,643 to Raines, et al. In these references, potassium sulphate is disclosed within flash suppressive propellant compositions. However, none of the patents discloses a structure or mechanism for adding significant amounts of the potassium sulfate with a burning propellant to create a flashless rocket plume without adversely affecting the critical performance of the rocket.

In view of the foregoing, there is a need for flashless rocket motor that does not impede the proper burning of the rocket propellant. The present invention addresses this and other needs.

SUMMARY OF THE INVENTION

The present invention includes a flashless rocket propellant assembly comprising a solid rocket propellant component having a first burning part and a final burning part and a potassium sulfate rod spaced from the propellant component, the potassium sulfate rod having a narrow diameter end positioned adjacent to the first burning part of the propellant component and a large diameter end positioned adjacent to the final burning part of the propellant component, wherein the potassium sulfate rod is substantially continuous along the length of the propellant component.

The present invention also includes a method for producing a flashless rocket exhaust comprising the steps of providing a flashless rocket propellant assembly comprising a solid rocket propellant component having a first burning part and a final burning part and a potassium sulfate rod spaced from the propellant component, the potassium sulfate rod having a narrow diameter end positioned adjacent to the first burning part of the propellant component and a large diameter end positioned adjacent to the final burning part of the propellant component, wherein the potassium sulfate rod is substantially continuous along the length of the propellant component and igniting the propellant component to initiate burn wherein the resulting exhaust is flashless.

The present invention further includes a flashless rocket exhaust produced by the process comprising the steps of providing a flashless rocket propellant comprising a solid rocket propellant component having a first burning part and a final burning part and a potassium sulfate rod spaced from the propellant component, the potassium sulfate rod having a narrow diameter end positioned adjacent to the first burning part of the propellant component and a large diameter end positioned adjacent to the final burning part of the propellant component, wherein the potassium sulfate rod is substantially continuous along the length of the propellant component and igniting the propellant component to initiate burn wherein the resulting exhaust is flashless.

DETAILED DESCRIPTION OF THE PREFERRED EMBODIMENT

The present invention comprises a flashless rocket propellant. The flashless rocket propellant incorporates a potassium sulfate rod adjacent to and along the length of the propellant, with additional amounts of potassium sulfate in salted end sleeves within the rocket motor. This $K_2SO_4$ rod is designed to not interfere with the burning characteristics of the propellant while providing a substantially continuous amount of potassium sulfate into the burning propellant. The present invention is useful in rocket motors, such as the MK 66 Rocket Motor, to improve aircraft and pilot safety during night firings. The potassium sulfate suppresses the visible motor flash which can reveal the aircraft's position. The flashless rocket propellant also prevents an overload of the night vision goggles worn by pilots, which can cause the pilot to fly blind for a few seconds.

Flashless is generally defined as exhibiting from about 15 percent or less irradiance, at between 400 and 650 nm wavelength of light, when compared to propellant burn without the incorporation of potassium sulfate. Preferred decreases of irradiance range from about 10 percent or less, with the irradiance decrease most preferably ranging from about 8 percent or less. For example, the present invention has been shown to decrease the flash of the MK 66 Rocket Motor from approximately 30.49 $\mu W/cm^2$ to approximately 3 $\mu W/cm^2$. A visible signature of the MK 66 Rocket Motor is most preferred at a flashless amount of 2.50 $\mu W/cm^2/nm$ or less.

Figure 1:
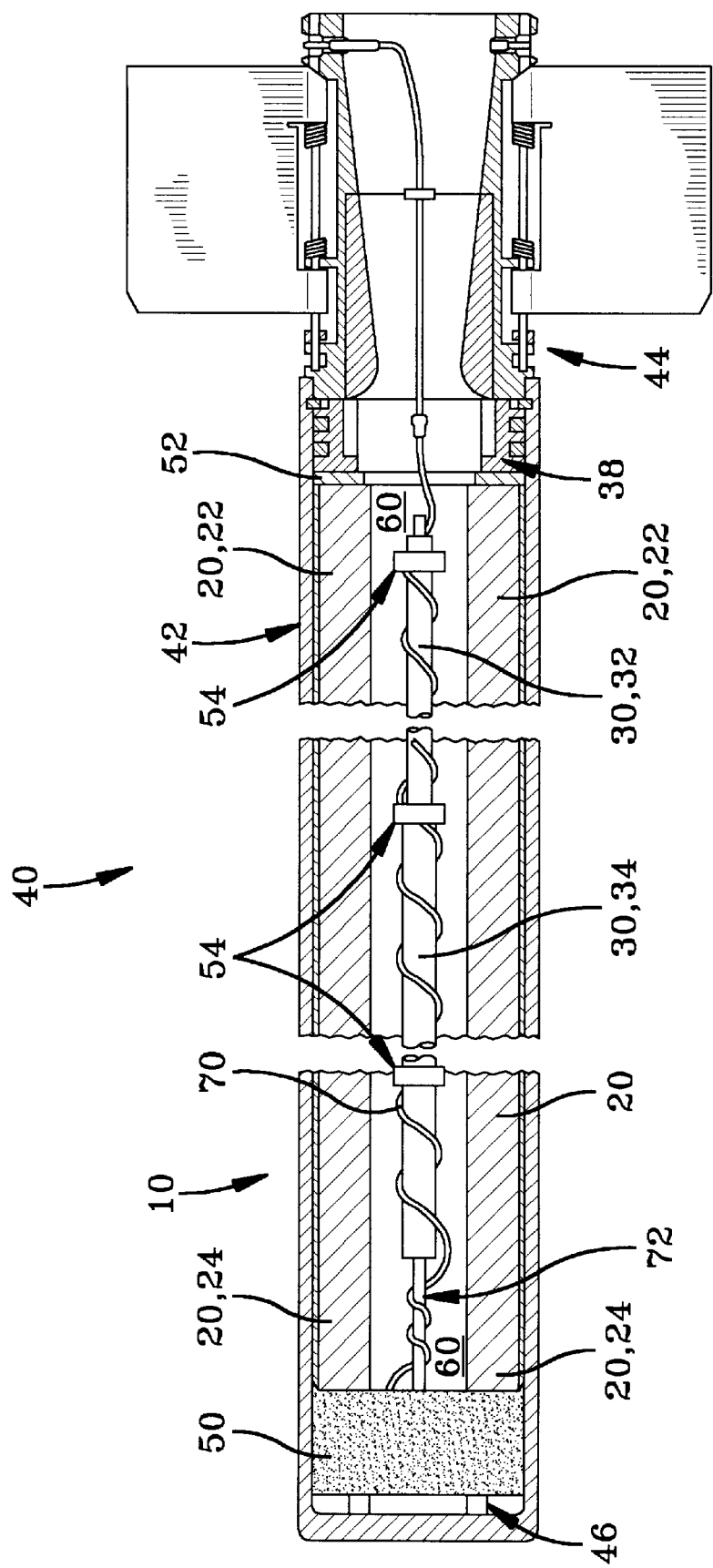
FIG. 1 illustrates a cross-sectional side view of a flashless MK 66 Rocket Motor of the present invention; and, FIGS. 1A, 1B and 1C illustrate various configurations of the potassium sulfate rod of the present invention.

As seen in FIG. 1, the present invention includes a flashless rocket propellant 10 comprising a solid rocket propellant component 20 having a first burning part 22 and a final burning part 24 together with a potassium sulfate rod 30 having a narrow diameter end 32 positioned adjacent to the first burning part 22 of the propellant component 20 and a large diameter end 34 positioned adjacent to the final burning part 24 of the propellant component 20. The flashless rocket propellant 10 is housed within a MK 66 Rocket Motor 40 having a rocket motor tube 42 next to a nozzle section 44 at the rear of the rocket motor tube 42 and a igniter 46 forward of the rocket motor tube 42.

The propellant component 20 comprises any suitable propellant useful in rocket motors, typically a double-base propellant mix, or other similar rocket fuel that contain approximately two energetic constituents, namely a cellulose nitrate, ie., nitrocellulose, and a nitrated oil, i.e., nitroglycerine. Additionally, the proper type of propellant component 20 comprises a suitable composition that may be rendered flashless by the addition of $K_2SO_4$, with the selection of a propellant component 20 determinable by those skilled in the art. The propellant component 20 lines the inside of the rocket motor tube 42, extending from a ignitor section 50 to a bore plate 52. The propellant component 20 burns in a generally progressive manner from rear, i.e., next to the nozzle section 44, to the forward, i.e., next to the igniter section 50. The propellant component 20 forms a cavity area 60 within the center of the propellant component 20, and possesses a constant thickness along its entire length. Wiring 70 connecting the igniter 46 to the nozzle section 44 extends through the cavity area 60. Preferably, the propellant component 20 forms a cylindrical cavity therein.

Figure 1A:
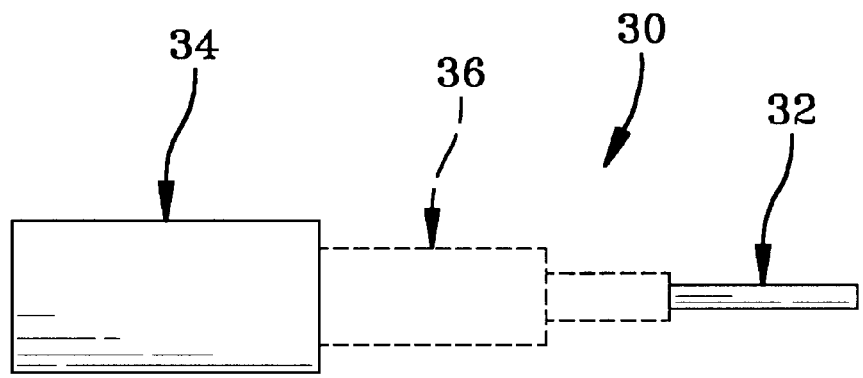
Figure 1B:
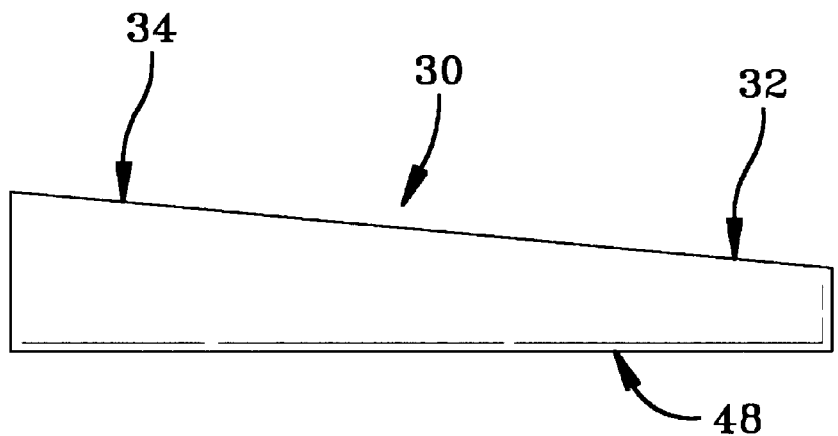
Figure 1C:
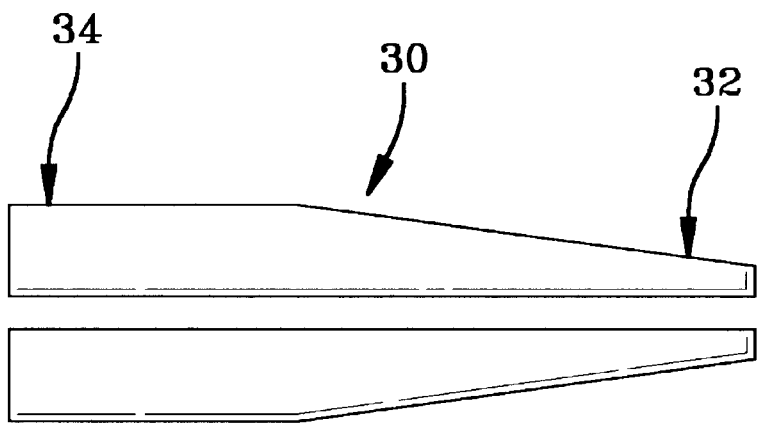

The potassium sulfate rod 30 is located within the cavity area 60 formed by the propellant component 20, with the potassium sulfate rod 30 extending through the formed cavity area 60. The potassium sulfate rod 30 is spaced, i.e., separated from the propellant component 20 by an air gap, and positioned within the center of the cavity area 60. The air gap preferably comprises an environment of ambient air, with the air gap distance being determinable by those skilled in the art. The potassium sulfate rod 30 comprises at least two different diameters along the length thereof, with the narrow diameter end 32 positioned adjacent to the first burning part 22 of the propellant component 20 and a large diameter end 34 positioned adjacent to the final burning part of the propellant component 24. As seen in FIG. 1A, a plurality of intermediate potassium sulfate segments 36 may be placed between the narrow diameter end 32 and large diameter end 34. The number of intermediate segments 36 is determinable by those skilled in the art for providing effective flashless burning of the propellant component 20, such as from about ten, five, three, two, or one intermediate segments or less. Preferably, any intermediate segments 36 comprise decreasing diameters along the length of the potassium sulfate rod 30 from the large diameter end 34 to the narrow diameter end 32. Each of the segments, i.e., the narrow diameter end 32, large diameter end 34 and any intermediate segments 36, preferably comprises a cylindrical configuration. As further seen in FIG. 1B, the shape of the potassium rod 30 may comprise a conical configuration 48. An additional preferred embodiment is shown in FIG. 1C, illustrating at least a second potassium sulfate rod 30 incorporated within the cavity area 60 of the propellant component 20. Most preferably, the potassium rod 30 comprises two sections, joined end to end, with no intermediate segments 38, i.e., the potassium sulfate rod 30 includes a two sectioned structure.

The potassium sulfate rod 30 is supported within the cavity area 60 by a stabilizing rod 72, such as a steel rod, that is fixed along the center axis of the rocket motor tube 42. The potassium sulfate rod 30 may be held by the stabilizing rod 72 by any suitable method for retaining the potassium sulfate rod 30 in place, such as interlocking parts, glues and other like adhesives, and other known retaining means.

As previously stated, most preferred embodiment comprises the potassium sulfate rod 30 having at least two separate rod sections, i.e., the narrow diameter end 32 and large diameter end 34 joined together, end-to-end. The joining of the separate rod sections may be any suitable adhesive, connection, or device that fixes the position of one rod section to the end of at least the second rod section without interfering with the combustion of the propellant component 20. Adhesives include epoxies, integrated binders, and the like, with other connection means being felt pads 54 or other like supports. For example, felt pads 54 surround the potassium sulfate rod 30 in a donut shape and are ejected out of the rocket motor tube 42 during combustion. Adhesives need to be chemically compatible with the propellant component 20 for long term storage. The type and manner of fixing one rod section to another rod section is determinable by those skilled in the art. Preferably, the potassium sulfate rod 30 comprises a structure 36 along a single axis relative to the length of the propellant component 20, which may includes any suitable configuration, such as a cylindrical configuration having curvature sides, ie., circular or oval surfaces, or polygonal siding, i.e., triangular, square, pentagonal, etc., surfaces along the length of the cylinder. Other configurations also may be used, such as cruciform, starred and like surfaces. The side of the potassium sulfate rod 30 may be grated or otherwise etched or scored.

The amount of potassium sulfate provided by the potassium sulfate rod 30 is any suitable amount for creating a flashless burning of propellant component 20, and is determinable by those skilled in the art. Preferred amounts include a weight percent ratio of propellant to potassium sulfate in the range of from about 20:1 to about 30: 1, with more preferred amounts from about 22:1 to about 26:1, and most preferred amounts from about 23:1 to about 25:1.

The potassium sulfate rod 30 is formed from potassium sulfate and a binder capable of retaining the potassium sulfate in a given rod shape, with the type of binder known by those skilled in the art. Preferably the binder comprises ethyl cellulose. The amount of $K_2SO_4$ within a potassium sulfate rod 30 preferably ranges from about 70 wt % to about 90 wt %, combined with from about 10 wt % to about 30 wt % binder. Additionally components may be added within the potassium sulfate rod 30, with the amounts of $K_2SO_4$ and binder varied for particular uses, with any variations in the amount of $K_2SO_4$ and binder determinable by those skilled in the art.

The potassium sulfate rod 30 comprises a substantially continuous structure 36 along the length of the propellant component 20, preferably in the form of a single solid mass between the narrow diameter end 32 and large diameter end 34. Non-singular structures also may be used, provided that the non-singular structures deliver an even distribution of $K_2SO_4$ into the burning propellant 20 during ignition within the rocket motor tube 42. Generally the maximum separation between potassium sulfate rods 30 ranges from about ½ inch or less, with decreasing separations generally increasingly preferred, such as from about ⅜ inch, ¼ inch and ⅛ inch or less. In either the single solid mass form or separated form, the potassium sulfate rods 30 extend together along substantially the full length of the propellant component 20 in a manner that allows a continuous feed of potassium sulfate into the propellant component 20 during burning.

In addition to the potassium sulfate rod 30, the flashless rocket propellant 10 of the present invention comprises a potassium sulfate end sleeve 38. The potassium sulfate sleeve 38 provides a source of potassium sulfate into the burning propellant after the potassium sulfate from the potassium sulfate rods 30 has been exhausted. The potassium sulfate sleeve 38 is separated from the propellant component 20 and the potassium sulfate rod 30 by the bore plate 52. As seen in FIG. 1, the potassium sulfate sleeve 38 is formed along the inside of the rocket motor tube 42 in the shape of a donut that does not interfere with the opening of the bore plate 52 between the propellant component and nozzle section 44. Similar to the composition of the potassium sulfate rod 30, the potassium sulfate sleeve 38 possesses a binder to form the potassium sulfate sleeve 38 into a singular solid structure. However, amounts of potassium sulfate to binder within the potassium sulfate sleeve 38 are generally lower, such as preferably ranging from about 40 wt % to about 60 wt % potassium sulfate and from about 40 wt % to about 60 wt % binder. Slots are added into the potassium sulfate sleeve 38 to allow the maximum amount of salt to be ablated into the exhaust stream, i.e., increase erosion during burn, without compromising the motor ballistic performance and safety.

The flashless rocket propellant 10 is particularly useful in rocket motors, such the MK 66 Rocket Motor 40. Preferably when used in the MK 66 Rocket Motor 40, the narrow diameter end 32 of the potassium sulfate rod 30 comprises a diameter of from about 0.30 inch to about 0.35 inch, with a length of approximately 9 inches. The large diameter end 34 comprises a diameter of from about 0.40 inch to about 0.60 inch, with a length of approximately 17 inches long. The propellant component 20 weighs approximately 7.2 pounds and comprises a length of approximately 30.5 inches that extends along the inside of the rocket motor tube 42 in an elongated donut shape with a diameter of approximately 2.6 inches. The large diameter end 34 of the potassium sulfate rod 30 does not extend against the ignition section 50, as minimal gas flow occurs and all of the potassium sulfate rod 30 would not be consumed within this area. The air gap separates the potassium sulfate rod 30 from the propellant component 20 by a distance of approximately ¼ inch. The igniter 46 causes the propellant component 20 to burn, which consumes the potassium sulfate rod 30 progressively from the narrow diameter end 34 to the large diameter end 34.

In operation, ie., during burn, a flashless rocket exhaust is produced. Within the first 100 milliseconds the narrow diameter end 32 is consumed followed by the large diameter end 34 that is consumed during the next 200 milliseconds. During the remaining 700 milliseconds of a typical burn, i.e., the approximately last ⅔ of the burn time, potassium sulfate is supplied into the exhaust from the potassium sulfate sleeve 38.

The present invention overcomes problems of over-pressurization within the rocket motor tube 42 while providing sufficient amounts of $K_2SO_4$ into the exhaust stream to provide a flashless burn. Over-pressurization occurs within the rocket motor tube 42, generally at the bore plate 52, from gas flow, bore size, bore obstruction (size and distance of the potassium sulfate rod 30), and other like factors. Without the configuration of the narrow and large diameter ends 32 and 34 of the potassium sulfate rod 30 and potassium sulfate sleeve 38, either over-pressurization occurs or there is not a sufficient flow of potassium sulfate into the exhaust to create a flashless exhaust, i.e., the potassium sulfate rod 30 and potassium sulfate sleeve 38 configuration do not allow the maximum amount salt without compromising the motor ballistic performance and safety. Use of the narrow diameter end 32 and locating the potassium sulfate rod 30 away from the bore plate 52 ensures that over-pressurization do not occurs, while the large diameter end 34 and potassium sulfate sleeve 38 ensure a potassium sulfate supply during the entire burn. For example, maximum pressure for the MK 66 Rocket Motor 40 ranges form about 2400 psi or less, i.e., 1.5 times the burst pressure of the rocket motor tube 42. Calculation of the over-pressurization of a given rocket motor tube 42 is readily determinable from the described factors by those skilled in the art. Accordingly, proper diameters and placement of the potassium sulfate rod 30 also are determinable by those skilled in the art.

An extensive feasibility test program was conducted on prototype flashless MK 66 Rocket Motors 40. The test involved environmental, static fire and ground launch testing.

EXAMPLE 1

Rocket motors were temperature conditioned and static fired at −50° F. Rocket motor action time, pressure, thrust, total impulse and plume temperature were recorded. Thermocouple probes recorded exhaust plume temperature. The internal ballistic results were judged against the 2.75 inch rocket motor ballistic performance requirements specified in AS 2544J. All rocket motors passed ignition delay, action time and total impulse requirements.

A spectrometer was used to record the flash intensity in the visible wavelength band (400 to 650 nm wavelength of light). The MK 66 MOD 3 Rocket Motor showed a total irradiance value at −50° F. of approximately 30.49 $\mu W/cm^2$. The Flashless MK 66 Rocket Motor of the present invention showed a total irradiance values of less than 3 $\mu W/cm^2$, and showed a very slight irradiance near the end of the one second burn.

EXAMPLE 2

The flashless rocket motor as assembled with inert M229 warheads and single fired at night, at an ambient temperature of 77° F. The flashless flight distance of each rocket was captured on long exposure photographs. The external ballistics were recorded by doppler radar. All rockets were flashless to burn out (a distance of 800 feet) except for the igniter flash.

The foregoing summary, description, examples and drawings of the invention are not intended to be limiting, but are only exemplary of the inventive features which are defined in the claims.

What is claimed is:

1. A flashless rocket propellant assembly, comprising:
   a solid rocket propellant component having a first burning part and a final burning part; and;
   a potassium sulfate rod spaced from the propellant component, the potassium sulfate rod having a narrow diameter end positioned adjacent to the first burning part of the propellant component and a large diameter end positioned adjacent to the final burning part of the propellant component,
wherein the potassium sulfate rod is substantially continuous along the length of the propellant component.

2. The flashless rocket propellant assembly of claim 1, further comprising a potassium sulfate end sleeve.

3. The flashless rocket propellant assembly of claim 1, wherein the propellant component forms a cylindrical cavity therein.

4. The flashless rocket propellant assembly of claim 3, wherein the potassium sulfate rod extends through the formed propellant cavity.

5. The flashless rocket propellant assembly of claim 4, wherein the potassium sulfate rod is positioned in the center of the propellant component.

6. The flashless rocket propellant assembly of claim 1, wherein the potassium sulfate rod comprises a cylindrical configuration.

7. The flashless rocket propellant assembly of claim 1, wherein the potassium sulfate rod and propellant component are spaced by ambient air.

8. The flashless rocket propellant assembly of claim 1, wherein the potassium sulfate rod comprises from about 70 wt % to about 90 wt % $K_2SO_4$ and from about 10 wt % to about 30 wt % binder.

9. The flashless rocket propellant assembly of claim 8, wherein the binder comprises ethyl cellulose.

10. The flashless rocket propellant assembly of claim 1, wherein the potassium sulfate rod comprises at least two separate rod section joined together.

11. The flashless rocket propellant assembly of claim 1, wherein the weight percent of propellant to potassium sulfate rod comprises a ratio of from about 20:1 to about 30:1.

12. The flashless rocket propellant assembly of claim 11, wherein the weight percent of propellant to potassium sulfate rod comprises a ratio of from about 22:1 to about 26:1.

13. The flashless rocket propellant assembly of claim 12, wherein the weight percent of propellant to potassium sulfate rod comprises a ratio of from about 23:1 to about 25:1.

14. The flashless rocket propellant assembly of claim 1, further comprising a plurality of intermediate segments between the narrow diameter end and large diameter end.

15. The flashless rocket propellant assembly of claim 9, wherein the plurality of intermediate segments comprise from about three or less intermediate segments.

16. The flashless rocket propellant assembly of claim 9, further comprising at least a second potassium sulfate rod.

17. A rocket comprising the flashless rocket propellant assembly of claim 1.

18. An MK 66 Rocket Motor comprising the flashless rocket propellant assembly of claim 1.

19. A method for producing a flashless rocket exhaust, comprising the steps of:
providing a flashless rocket propellant assembly comprising a solid rocket propellant component having a first burning part and a final burning part and a potassium sulfate rod spaced from the propellant component, the potassium sulfate rod having a narrow diameter end positioned adjacent to the first burning part of the propellant component and a large diameter end positioned adjacent to the final burning part of the propellant component, wherein the potassium sulfate rod is substantially continuous along the length of the propellant component; and,
igniting the propellant component to initiate burn wherein the resulting exhaust is flashless.

* * * * *